United States Patent
Muljono et al.

(10) Patent No.: US 6,738,844 B2
(45) Date of Patent: *May 18, 2004

(54) IMPLEMENTING TERMINATION WITH A DEFAULT SIGNAL ON A BUS LINE

(75) Inventors: Harry Muljono, Union City, CA (US); Chris Freeman, Portland, OR (US); R. Kenneth Hose, Jr., Aloha, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/219,809
(22) Filed: Dec. 23, 1998
(65) Prior Publication Data US 2003/0208646 A1 Nov. 6, 2003

(51) Int. Cl.⁷ .................................................. G06F 1/00
(52) U.S. Cl. ........................................ 710/107; 710/110
(58) Field of Search ........................... 710/104, 105, 710/106, 107, 110, 15–18; 326/30

(56) References Cited

U.S. PATENT DOCUMENTS

| | | | | |
|---|---|---|---|---|
| 4,016,541 A | * | 4/1977 | Delagi et al. ............. 340/172.5 |
| 4,573,154 A | | 2/1986 | Nakata et al. ................. 371/34 |
| 4,701,841 A | * | 10/1987 | Goodrich et al. ............ 710/128 |
| 4,744,024 A | | 5/1988 | Potash et al. ................. 364/200 |
| 4,825,402 A | * | 4/1989 | Jalali ............................ 326/30 |
| 5,056,110 A | * | 10/1991 | Fu et al. ........................ 375/36 |
| 5,153,459 A | * | 10/1992 | Park et al. .................... 307/452 |
| 5,247,522 A | | 9/1993 | Reiff .......................... 371/29.5 |
| 5,305,385 A | | 4/1994 | Schanning et al. ............ 380/49 |
| 5,307,345 A | | 4/1994 | Lozowick et al. ............. 370/61 |
| 5,343,503 A | | 8/1994 | Goodrich ..................... 375/121 |
| 5,448,591 A | | 9/1995 | Goodrich ..................... 375/257 |
| 5,467,455 A | * | 11/1995 | Gay et al. .................... 710/101 |
| 5,530,377 A | * | 6/1996 | Walls ............................ 326/30 |
| 5,541,535 A | * | 7/1996 | Cao et al. ...................... 326/83 |
| 5,578,940 A | | 11/1996 | Dillon et al. ................... 326/30 |
| 5,663,661 A | | 9/1997 | Dillon et al. ................... 326/30 |
| 5,729,152 A | * | 3/1998 | Leung et al. .................. 326/21 |
| 5,767,695 A | * | 6/1998 | Takekuma et al. ............. 326/30 |
| 5,809,263 A | * | 9/1998 | Farmwald et al. ........... 710/129 |
| 5,821,767 A | * | 10/1998 | Osaka et al. ................... 326/30 |
| 5,822,543 A | | 10/1998 | Dunn et al. ............. 395/200.54 |
| 5,831,467 A | * | 11/1998 | Leung et al. ................. 327/319 |
| 5,881,066 A | | 3/1999 | Lepitre ....................... 371/20.5 |
| 5,949,254 A | | 9/1999 | Keeth ........................... 326/87 |
| 6,005,895 A | * | 12/1999 | Perino et al. ................ 375/288 |
| 6,026,456 A | | 2/2000 | Ilkbahar ...................... 710/101 |
| 6,051,989 A | * | 4/2000 | Walck ........................... 326/30 |
| 6,078,978 A | * | 6/2000 | Suh ............................. 710/129 |
| 6,092,212 A | | 7/2000 | Muljono et al. ............. 713/600 |
| 6,124,747 A | | 9/2000 | Nasu ........................... 327/281 |
| 6,232,792 B1 | * | 5/2001 | Starr ............................. 326/30 |
| 6,265,893 B1 | * | 7/2001 | Bates ............................ 326/30 |
| 6,347,350 B1 | | 2/2002 | Muljono ...................... 710/100 |
| 6,366,129 B1 | | 4/2002 | Douglas, III et al. ......... 326/86 |

FOREIGN PATENT DOCUMENTS

JP 51-127602 11/1976 ........... H04L/11/26

OTHER PUBLICATIONS

Muljono, Harry, "Driving the Last Inbound Signal on a Line in a Bus with a Termination", Pending U.S., Application Ser. No. 10/047,277, filed Jan. 14, 2002.

* cited by examiner

Primary Examiner—Paul R. Myers
Assistant Examiner—Raymond N Phan
(74) Attorney, Agent, or Firm—Schwegman, Lundberg, Woessner & Kluth, P.A.

(57) ABSTRACT

Implementing termination on a bus. According to one embodiment of the present invention a driver drives a default signal on to a line, then drives an information signal on to the line, and then drives the default signal on to the line after driving the information signal on to the line.

43 Claims, 7 Drawing Sheets

IMPLEMENTING TERMINATION WITH A DEFAULT SIGNAL ON A BUS LINE

FIELD OF THE INVENTION

The invention relates generally to buses for processor based systems, and more particularly to implementing termination on a bus.

BACKGROUND

Computer systems include a processor, one or more memory devices, and one or more input-output or I/O devices. The processor, the memory devices, and the I/O devices communicate with each other through a bus in the computer system. A bus is a communication link comprising a set of wires or lines connected between the devices listed above. The bus is shared by the devices as they communicate with one another. A bus may also be a set of lines connected between two functional circuits in a single integrated circuit. The bus generally contains a set of control lines and a set of data lines. The control lines carry signals representing requests and acknowledgments and signals to indicate what type of data is on the data lines. The data lines carry data, complex commands, or addresses. A separate set of lines in the bus may be reserved to carry addresses, and these are called address lines. The devices communicate with each other over the bus according to a protocol that governs which devices may use the bus at any one time. The protocol is a set of rules governing communication over the bus that are implemented and enforced by a device that is appointed a bus master. Generally the processor is the bus master, although there may be more than one bus master. Each bus master initiates and controls requests to use the bus.

Two different schemes exist for organizing communication on a bus. A synchronous bus includes a clock pulse in the control lines and is governed by a protocol based on the clock pulse. An asynchronous bus does not rely on a clock pulse to organize communication. Rather, the asynchronous bus is coordinated by a handshaking protocol under which a sender communicates directly with a receiver to transfer data based on a series of mutual agreements. The sender and the receiver exchange a set of handshaking signals over the control lines before, during, and after each data transfer.

Signals are exchanged between the sender and the receiver over the bus in the following manner. The sender includes a driver, typically comprising a tri-state output buffer, connected to each bus line it is to send signals to. Likewise, the receiver typically has a high impedance input buffer such as an inverter connected to each bus line it is to receive signals from. When the sender sends a signal on a particular line it directs the appropriate driver to bring the line to a suitable voltage, either high or low. The receiver detects the signal in the appropriate inverter to complete the communication. A reflection of the signal can take place if the input impedance of the inverter is different from the characteristic impedance of the line. The discontinuity in the impedance causes the reflection. The signal is reflected back and forth along the line and the reflections must dissipate before the signal can be accepted as valid. This slows the operation of the bus and the computer system.

Signal reflection also causes inter-signal interference noise (ISI) on the bus. ISI contributes to timing delay variation which limits the frequency at which a bus can transfer signals. ISI must be substantially reduced in high frequency bus structures.

A conventional method of reducing reflection on a bus line is to damp or dissipate the reflection with a termination connected to the bus line. A termination is a dissipating or damping load, typically a resistive device, which has an impedance that is substantially similar to the characteristic impedance of the line. Two types of termination are used. A source termination comprises an impedance placed in a driver connected to the bus line. A parallel termination comprises impedances placed in a driver and an input buffer so that impedances are placed at both ends of a bus line. While the implementation of termination on a bus has been successful in reducing signal reflection, the implementation itself may cause problems with the operation and performance of the bus.

There remains a need for termination in high frequency bus structures and ways of implementing the termination to avoid the above-mentioned problems. For these and other reasons there is a need for the present invention.

SUMMARY OF THE INVENTION

According to one embodiment of the present invention a default signal is driven on to a line, then an information signal is driven on to the line, and the default signal is driven on to the line after the information signal is driven on to the line. Advantages of the present invention will be apparent to one skilled in the art upon an examination of the detailed description of the preferred embodiments.

DETAILED DESCRIPTION OF THE PREFERRED EMBODIMENTS

In the following detailed description of exemplary embodiments of the present invention, reference is made to the accompanying drawings which form a part hereof, and in which are shown by way of illustration specific exemplary embodiments in which the present invention may be practiced. These embodiments are described in sufficient detail to enable those skilled in the art to practice the present invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

In this description transistors are described as being in an active state or switched on when they are rendered conductive by an appropriate control signal, and the transistors are described as being in an inactive state or switched off when they are rendered non-conductive by the control signal.

Figure 1:
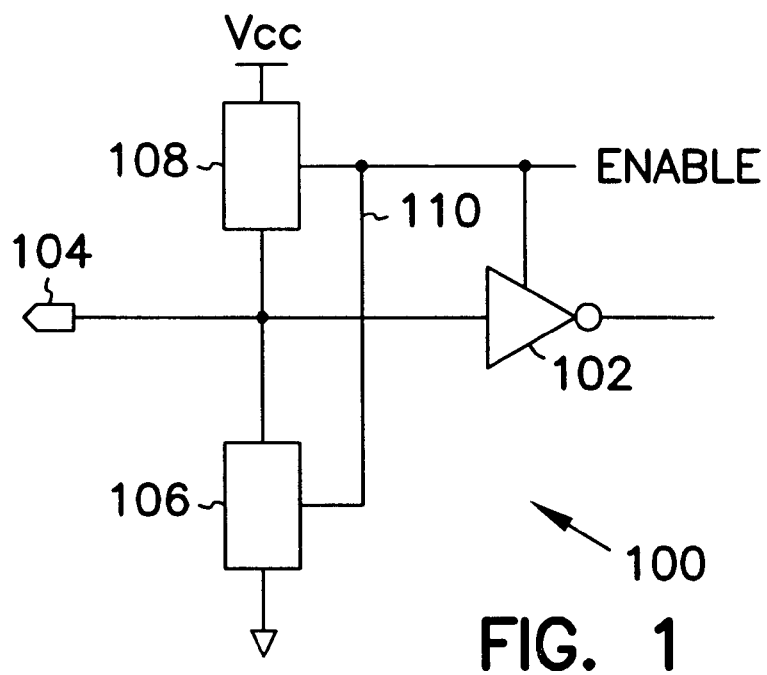
FIG. 1 is an electrical schematic diagram of a receiver according to an embodiment of the present invention.

One problem with the implementation of termination is that there is a substantial dissipation of power by receivers connected to a bus when the bus lines are not being driven and are left floating. This problem is described with reference to a receiver 100 with a center-tapped termination circuit (CTT) shown in FIG. 1 according to an embodiment of the present invention. The receiver 100 includes a high impedance buffer circuit such as an inverter 102 for relaying a signal from a terminal or pin 104 on a line in a bus to further circuitry. The CTT includes a first impedance device 106 connected between a ground and the pin 104, and a second impedance device 108 connected between the pin 104 and a supply voltage Vcc. Both the devices 106, 108 are coupled to a line 110 to receive an enable signal ENABLE that switches the devices 106, 108 on or off. When the devices 106, 108 are switched off by the ENABLE signal they are not conductive and the pin 104 is separated from the voltage Vcc and from ground by open circuits. When the devices 106, 108 are switched on by the ENABLE signal they each have the same impedance and couple the pin 104 midway between the voltage Vcc and ground. The devices 106, 108 are switched on by the ENABLE signal to enable the CTT when the receiver 100 is monitoring the line to receive a signal. The enabled CTT substantially reduces signal reflection in the line and thereby substantially reduces ISI. The devices 106, 108 may include transistors of different types. For example, the devices 106, 108 could be comprised of N-channel transistors, P-channel transistors, BJT or JFET transistors, or a combination of one or more of the above-listed transistors, or a combination of resistors and one or more of the above-listed transistors.

Figure 2:
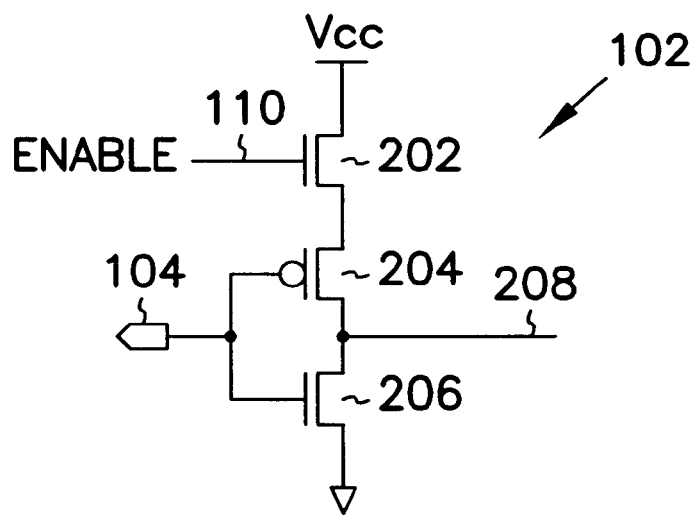
FIG. 2 is an electrical schematic diagram of an inverter according to an embodiment of the present invention.

In a bus according to an embodiment of the invention there is at least one device such as the receiver 100 with an enabled CTT connected to and monitoring each line for signals sent from other devices such as drivers. When a line is not being driven high or low by a driver it floats at a voltage Vcc/2 due to the enabled CTT which is similar to the CTT described above with reference to FIG. 1 and including the devices 106, 108. The inverter 102 in each receiver 100 connected to the line is then left in an indeterminate state and dissipates a substantial amount of power. The indeterminate state is described with reference to an electrical schematic diagram of the inverter 102 shown in FIG. 2 according to an embodiment of the present invention. The inverter 102 includes an enable transistor 202 having a control terminal coupled to the line 110 to receive the ENABLE signal, a high-side P-channel transistor 204, and a low-side N-channel transistor 206. The inverter 102 is enabled when the transistor 202 is switched on. The transistors 202, 204, 206 are connected between the voltage Vcc and ground. Control terminals of the transistors 204, 206 are connected together to the pin 104 to receive a signal on the line. When the inverter 102 is enabled by the ENABLE signal the transistor 202 is switched on and the signal at the pin 104 is either high or low, one of the transistors 204, 206 is switched on and the other is switched off to invert the signal. However, if the line is floating at the voltage Vcc/2 both of the transistors 204, 206 are switched on such that current, called crowbar current, flows through the enabled transistor 202 and the transistors 204, 206 to dissipate power.

Figure 3:
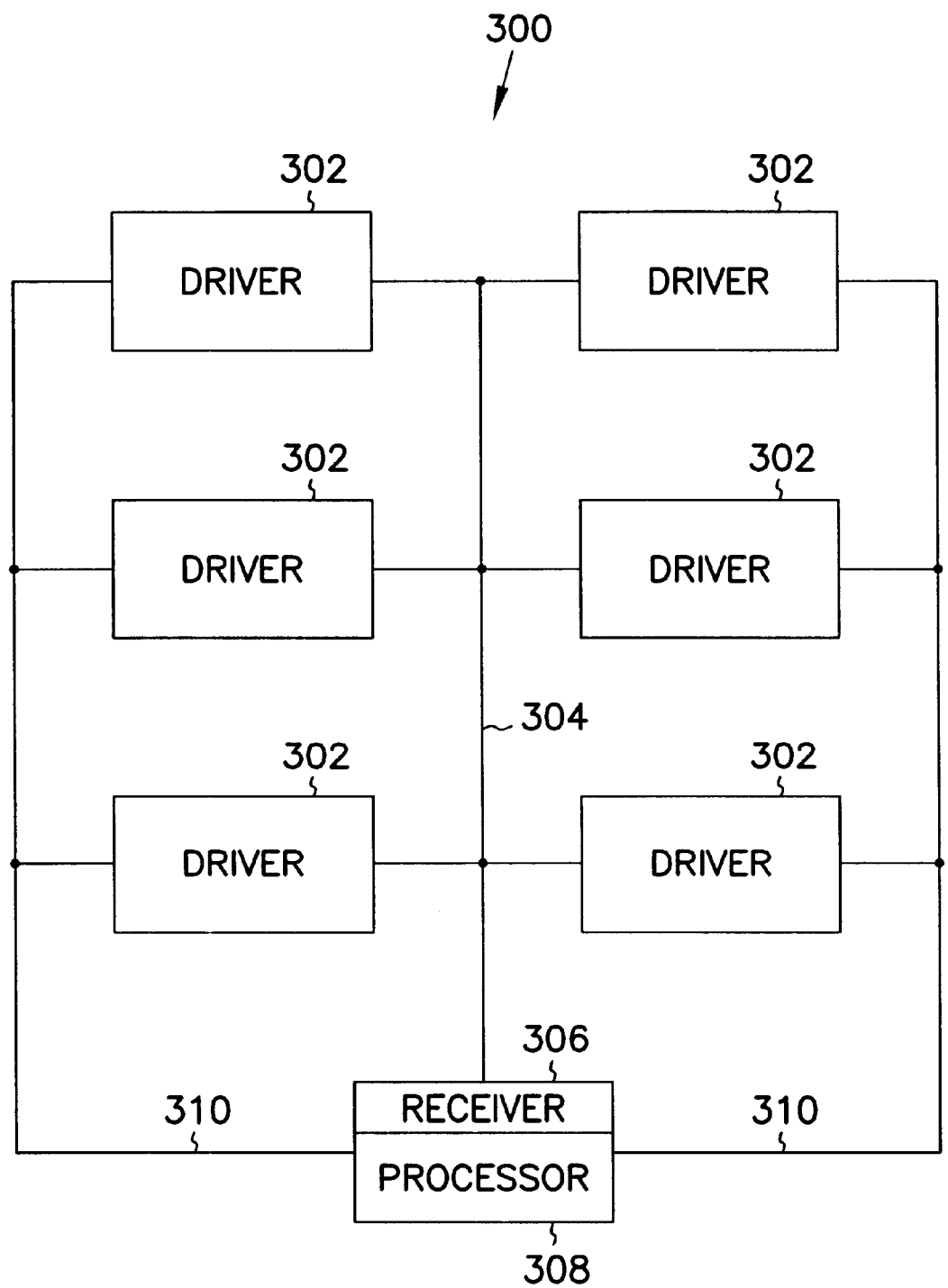
FIG. 3 is a block diagram of a system according to an embodiment of the present invention.

One type of bus line in which crowbar current can occur is a single control line with several drivers and at least one receiver, such as a unidirectional shared strobe bus line. A block diagram of a system 300 according to an embodiment of the present invention is shown in FIG. 3. The system 300 includes a number of drivers 302 connected to a single unidirectional shared strobe bus line 304. A receiver 306 is included in a central control circuit such as a processor 308 that is coupled to the line 304 through the receiver 306 to receive signals on the line 304. The processor 308 is also connected to control each of the drivers 302 with control signals sent over a set of lines 310. Each of the drivers 302 and the receiver 306 includes a CTT, and the receiver 306 also has an inverter similar to the inverter 102 shown in FIG. 1.

The line 304 provides for unidirectional or one-way communication between the drivers 302 and the receiver 306. Signals may be sent on the bus at any time without notification to the receiver 306. Therefore the CTT and the inverter in the receiver 306 are always enabled to receive a signal from one of the drivers 302. One of the drivers 302 is selected at a time to drive a signal to the receiver 306 over the line 304 to substantially reduce the possibility of bus contention that would occur if two or more drivers 302 were driving different signals to the receiver 306 at the same time. There are periods of inactivity in the operation of the line 304 when none of the drivers 302 are driving signals on to the line 304, and the line 304 is allowed to float at Vcc/2 due to the enabled CTT in the receiver 306. During the periods of inactivity the voltage Vcc/2 in the line 304 can cause crowbar current in the receiver 306 and at least some embodiments of the present invention described herein address this problem.

Figure 4:
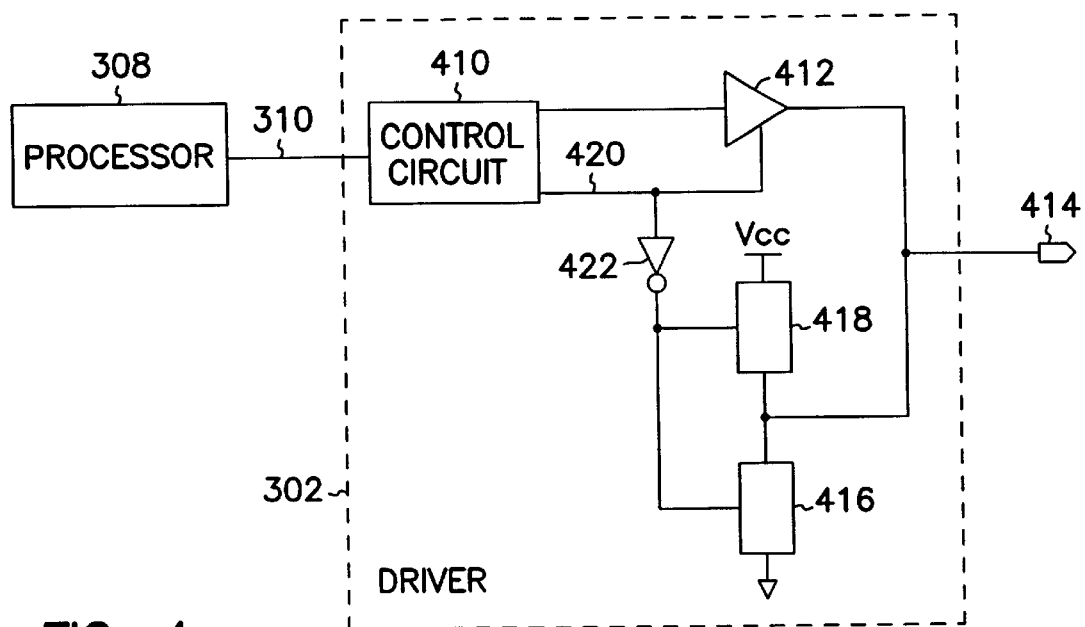
FIG. 4 is a block diagram of a driver according to an embodiment of the present invention.

The embodiments of the present invention are better described with reference to a more detailed description of the drivers 302 and the receiver 306. A block diagram of one of the drivers 302 is shown in FIG. 4 according to an embodiment of the present invention. Elements that are also shown in FIG. 3 retain the reference characters shown in FIG. 3. The driver 302 includes a control circuit 410 coupled to exchange signals with the processor 308 over the lines 310, and a tri-state output buffer 412 having an input connected to the control circuit 410 to receive a signal and an output connected to a terminal or pin 414 that is connected to the line 304 shown in FIG. 3. The driver 302 also includes a CTT having a first impedance device 416 connected between a ground and the pin 414, and a second impedance device 418 connected between the pin 414 and a supply voltage Vcc. The CTT and the output buffer 412 are enabled by an enable signal generated by the control circuit 410 and provided on a line 420 to the output buffer 412. When the enable signal is high the output buffer 412 relays the signal from the control circuit 410 to the pin 414. The enable signal is inverted by an inverter 422 and coupled to the devices 416, 418 to disable the CTT when the enable signal is high. Upon receiving suitable instructions from the processor 308 the control circuit 410 generates a low enable signal to tri-state the output buffer 412, which means to put it into a high-impedance state with respect to the pin 414, so that it stops relaying the signal. The low enable signal is inverted to enable the CTT such that signal reflection on the line 304 is dissipated in the CTT.

Figure 5:
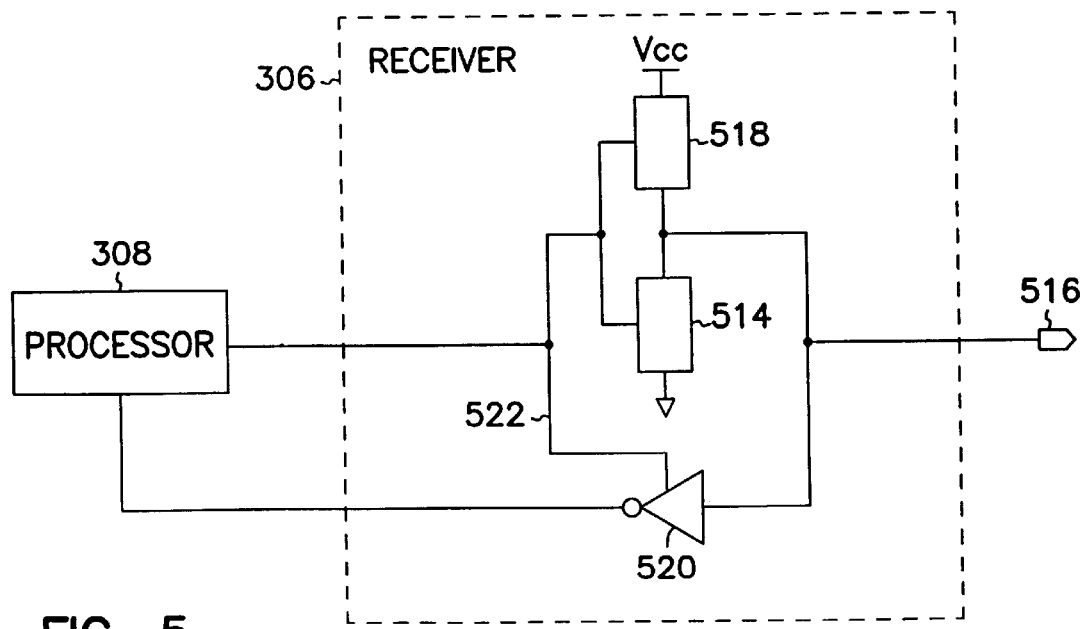
FIG. 5 is a block diagram of a receiver and a processor according to an embodiment of the present invention.

A block diagram of the receiver 306 is shown in FIG. 5 according to an embodiment of the present invention. Elements that are also shown in FIG. 3 retain the reference characters shown in FIG. 3. The receiver 306 includes a CTT having a first impedance device 514 connected between a ground and a terminal or pin 516 that is connected to the line 304 shown in FIG. 3, and a second impedance device 518 connected between the pin 516 and a supply voltage Vcc. The receiver 306 also includes an inverter 520 having an input connected to the pin 516 and an output connected to the processor 308. The inverter 520 is a high impedance input buffer that relays a signal on the line 304 to the processor 308. The CTT and the inverter 520 are enabled at the same time by an enable signal generated by the processor 308 and provided on a line 522.

According to an embodiment of the present invention, the processor 308 controls communication on the line 304 according to a protocol by sending control signals over the lines 310 to control the drivers 302 through the respective control circuits 410. The processor 308 enables the CTT and the inverter 520 in the receiver 306 to receive signals from the line 304. During inactive periods when none of the drivers 302 are driving signals to the receiver 306 the processor 308 directs all of the drivers 302 to drive a default signal on to the line 304, either high or low, to substantially reduce the amount of time that the line 304 is floating at Vcc/2. The processor 308 thereby substantially reduces the occurrence of crowbar current in the receiver 306 by forcing the inverter 520 to a definite state. All of the drivers 302 are directed to drive the same default signal to substantially reduce the possibility of contention on the line 304. Periodically the processor 308 selects one of the drivers 302, called an active driver, to drive a non-default or information signal containing information such as an address signal, a data signal, or a strobe signal to the receiver 306. To substantially reduce the possibility of contention on the line 304 the other drivers 302, called inactive drivers, are instructed by the processor 308 to tri-state their respective output buffers 412 and to enable their CTTs one or more clock cycles before the active driver is to begin driving the information signal. The one or more clock cycles comprise a first preselected delay. The inactive drivers may tri-state their output buffers at different times following the instructions from the processor 308, and the first preselected delay is imposed to ensure that all of the inactive drivers are tri-stated before the active driver is to begin driving the information signal. The active driver continues to drive the default signal and, after the first preselected delay, begins to drive the information signal to the receiver 306. When the transmission of the information signal is complete the active driver is instructed to resume driving the default signal on to the line 304, and following a second preselected delay of one or more clock cycles the inactive drivers are instructed to disable their CTTs and to release their output buffers 412 from the high-impedance state to resume driving the default signal on to the line 304. The second pre-selected delay is imposed to ensure that the active driver has resumed driving the default signal before the inactive drivers do so. According to this embodiment of the present invention the processor 308 governs communication over the line 304 to substantially reduce the amount of time the line 304 is floating at Vcc/2, and to thereby substantially reduce the occurrence of crowbar current.

The protocol outlined above may be carried out as a series of programmable instructions stored and implemented in the processor 308 or in the control circuits 410 of the drivers 302, or in both. The protocol may be implemented with alternative types of circuitry or hardware including one or more of the following: hardwired logic, a Field Programmable Gate Array (FPGA), a hardwired FPGA, programmable logic, a programmable microcontroller, an Application Specific Integrated Circuit (ASIC), a Read Only Memory (ROM), or a sequencer, or any suitable combination thereof. The hardware for implementing the protocol may be located in the processor 308, in the control circuits 410, or in both.

Figure 6:
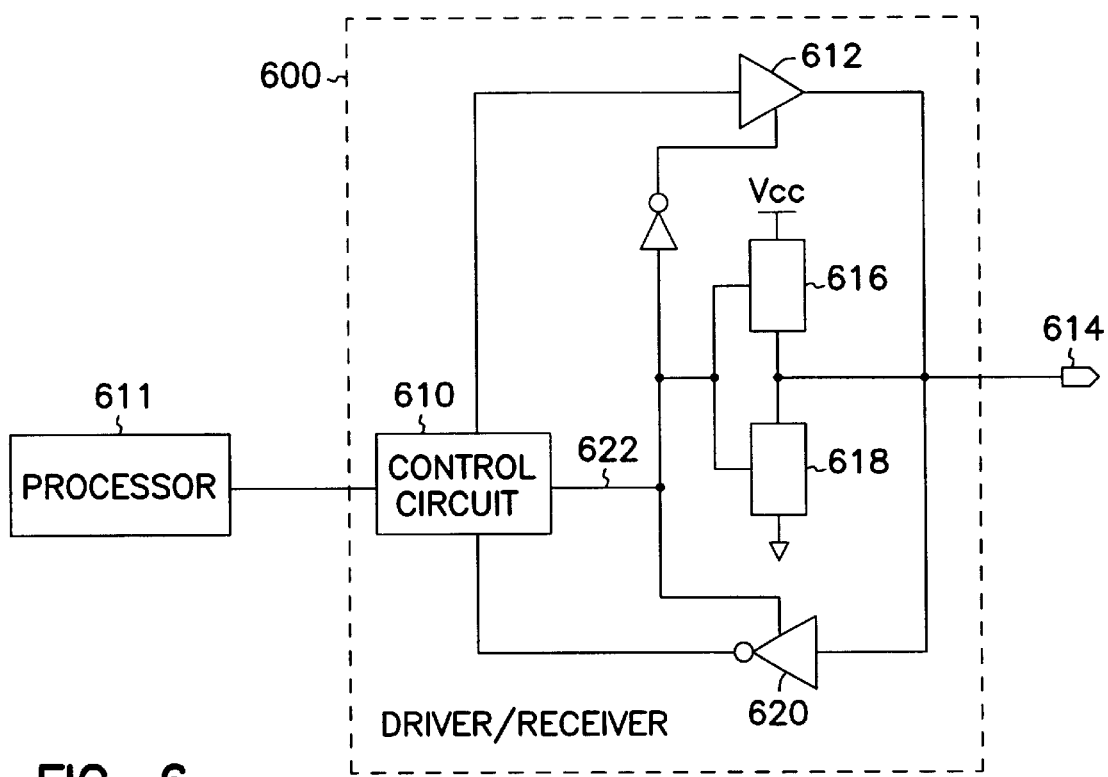
FIG. 6 is a block diagram of a driver/receiver according to an embodiment of the present invention.

The present invention is not limited to applications involving a line with multiple drivers and a single receiver, and may be applied to a line with multiple drivers and multiple receivers. In addition, some or all of the devices connected to the line 304 may have the capability to both drive signals on to the line and receive signals from the line. A block diagram of a driver/receiver 600 having attributes of the drivers 302 and the receiver 306 is shown in FIG. 6 according to an embodiment of the present invention. The driver/receiver 600 includes a control circuit 610 coupled to exchange signals with a processor 611. A tri-state output buffer 612 has an input connected to the control circuit 610 and an output connected to a terminal or pin 614 for connection to a line in a bus (not shown). A CTT having a first impedance device 616 and a second impedance device 618 is coupled between a ground and a supply voltage Vcc and is connected to the pin 614. The driver/receiver 600 also includes an inverter 620 having an input connected to the pin 614 and an output connected to the control circuit 610 to relay a signal to the control circuit 610. The output buffer 612, the CTT and the inverter 620 are enabled by an enable signal generated by the control circuit 610 and provided on a line 622. The driver/receiver 600 is controlled by the control circuit 610 to drive signals to the pin 614 and to receive signals from the pin 614 in a manner analogous to the operation of the drivers 302 and the receiver 306 described above with reference to FIGS. 4 and 5. The system 300 may include one or more driver/receiver 600 connected to the line 304 according to an embodiment of the present invention.

Figure 7:
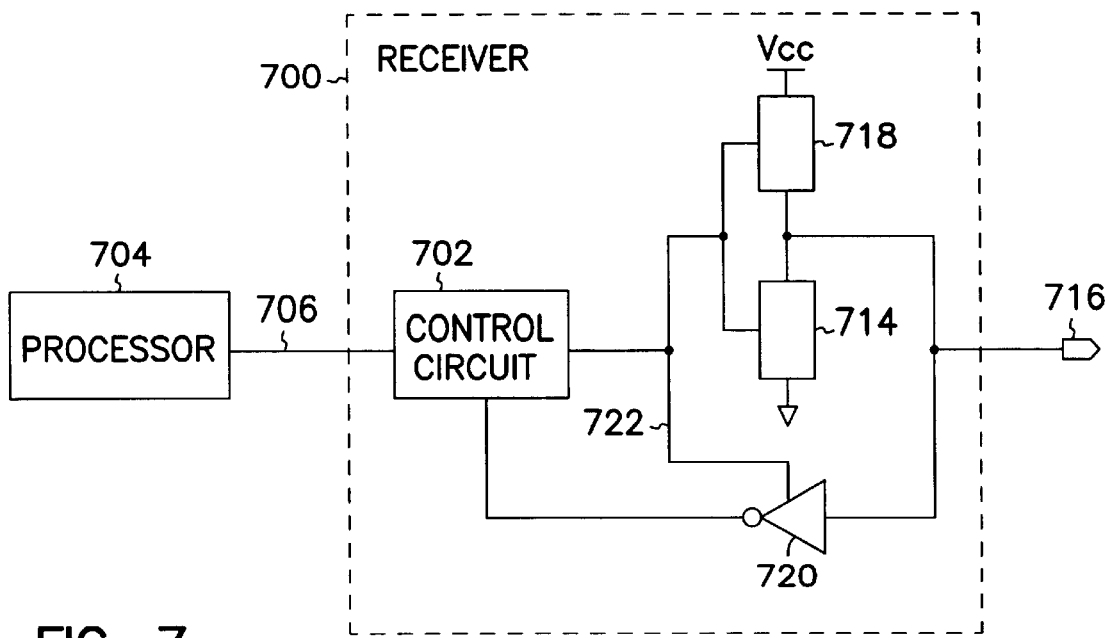
FIG. 7 is a block diagram of a receiver according to an embodiment of the present invention.

The present invention is also not limited to applications involving a receiver coupled directly to a processor, and may be applied to a line with multiple drivers and a single receiver exchanging signals with a processor. A block diagram of a receiver 700 is shown in FIG. 7 separated from a processor according to an embodiment of the present invention. The receiver 700 includes a control circuit 702 coupled to exchange signals with a processor 704 over a line 706. The receiver 700 also includes a CTT having a first impedance device 714 connected between a ground and a terminal or pin 716 that is connected to a bus line (not shown), and a second impedance device 718 connected between the pin 716 and a supply voltage Vcc. The receiver 700 also includes an inverter 720 having an input connected to the pin 716 and an output connected to the control circuit 702. The inverter 720 is a high impedance input buffer that relays a signal on the line to the control circuit 702. The CTT and the inverter 720 are enabled at the same time by an enable signal generated by the control circuit 702 and provided on a line 722. The receiver 700 is controlled by the control circuit 702 to receive signals from the pin 716 in a manner analogous to the operation of the receiver 306 described above with reference to FIG. 5. The system 300 may include one or more receivers 700 connected to the line 304 according to an embodiment of the present invention.

Figure 8:
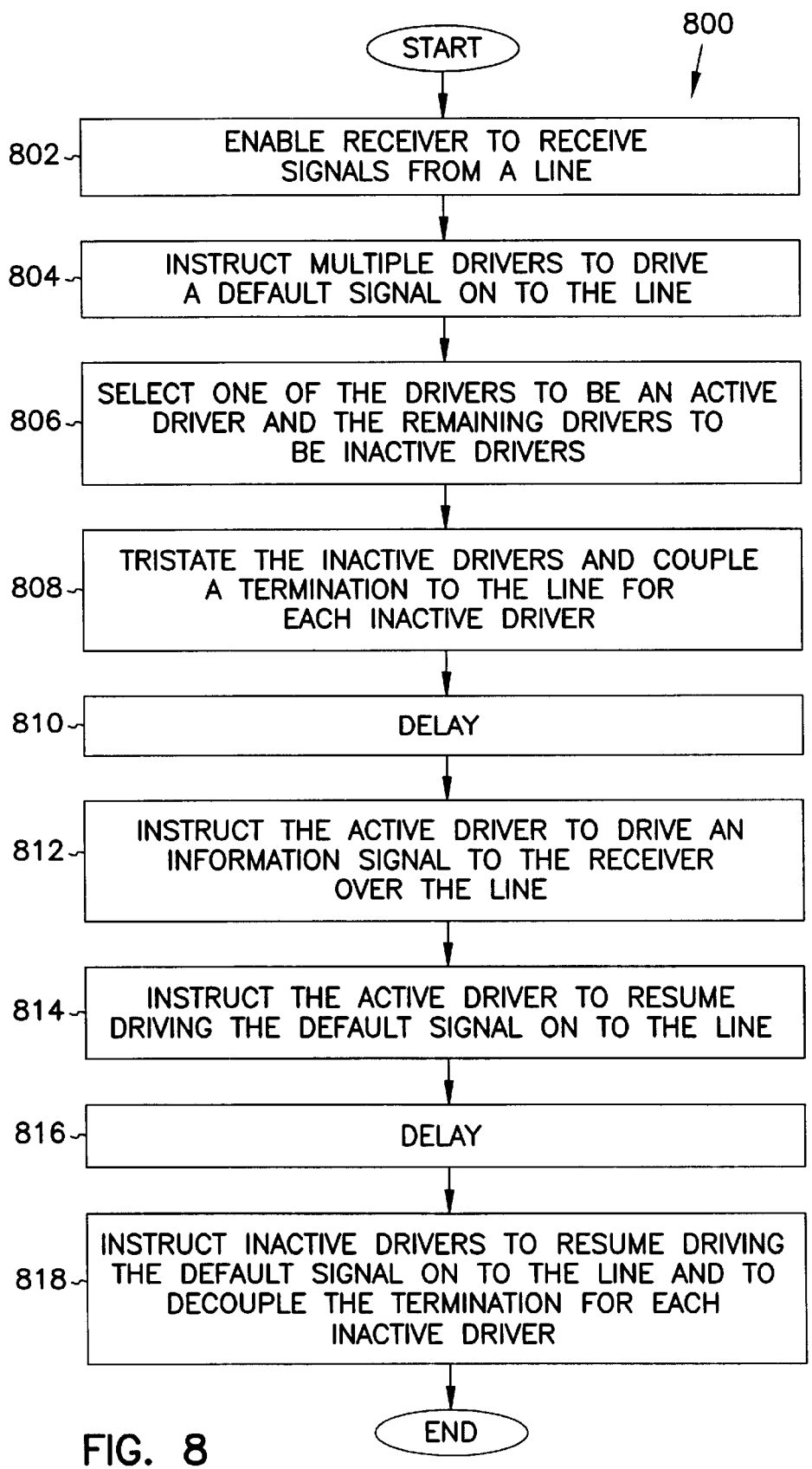
FIG. 8 is a flowchart of a method according to an embodiment of the present invention.

A flowchart of a method 800 for governing communication over a single line such as the line 304 shown in FIG. 3 according to an embodiment of the present invention is shown in FIG. 8. In 802 a receiver connected to the line is enabled to receive signals from the line, and in 804 multiple drivers connected to the line are instructed to drive a default signal, either high or low, on to the line. In 806 one of the drivers is selected to be an active driver and the remaining drivers are selected to be inactive drivers. The inactive drivers are tri-stated to stop them from driving the default signal and a termination such as the CTT described above is coupled to the line for each inactive driver in 808. The active driver continues to drive the default signal on to the line and, after a delay in 810, is instructed to drive an information signal to the receiver in 812. After the transmission of the information signal is complete the active driver is instructed to resume driving the default signal on to the line in 814. After a delay in 816 the inactive drivers are also instructed to resume driving the default signal on to the line and the termination is decoupled from the line for each inactive driver in 818.

The method 800 may be implemented in the system 300 shown in FIG. 3 as a series of programmable instructions stored and implemented in the processor 308 or in the control circuits 410 of the drivers 302, or in both. The method 800 may be implemented with alternative types of circuitry or hardware including one or more of the following: hardwired logic, a Field Programmable Gate Array (FPGA), a hardwired FPGA, programmable logic, a programmable microcontroller, an Application Specific Integrated Circuit (ASIC), a Read Only Memory (ROM), or a sequencer, or any suitable combination thereof. The hardware for implementing the method 800 may be located in the processor 308, in the control circuits 410, or in both.

Figure 9:
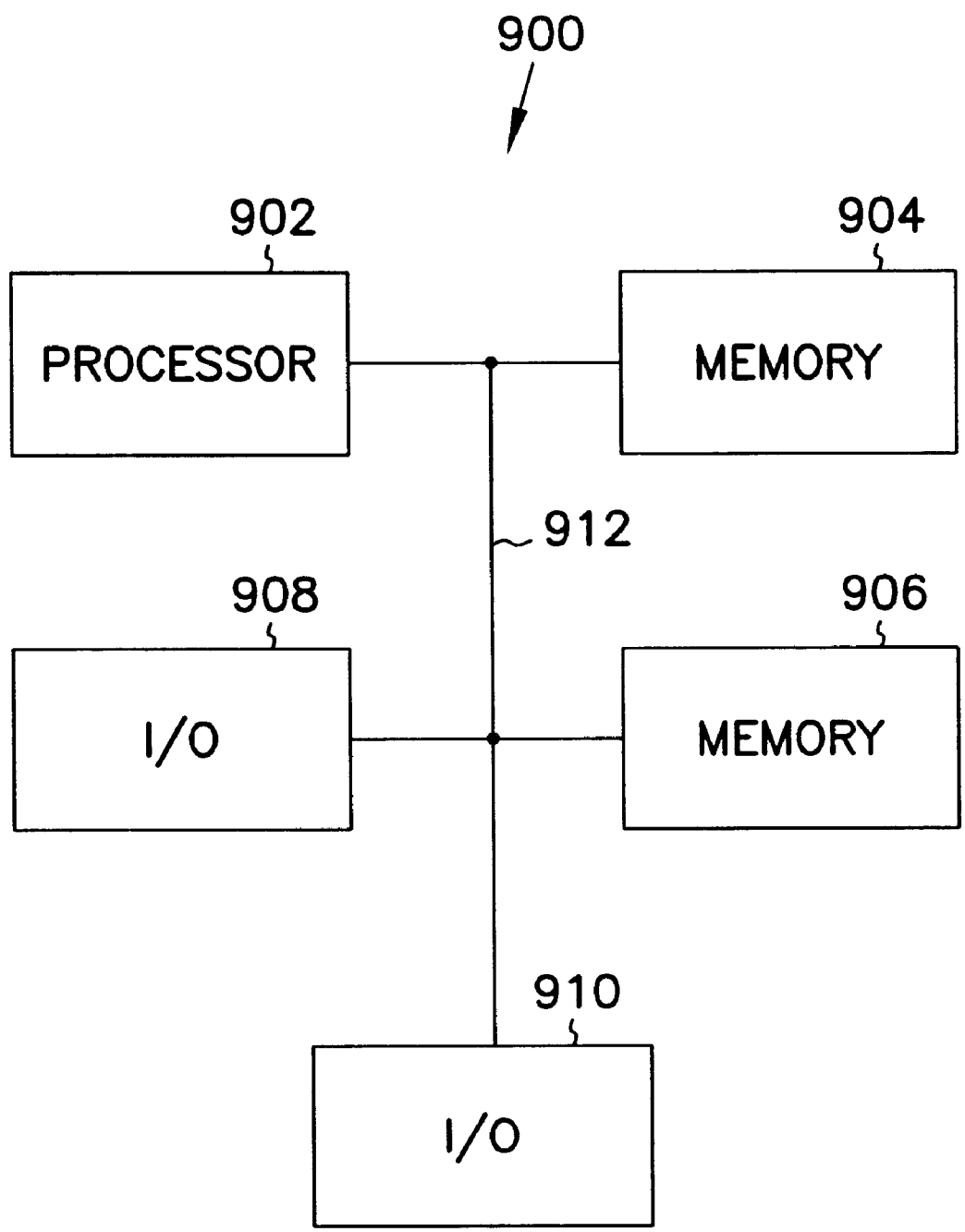
FIG. 9 is a block diagram of a computer system according to an embodiment of the present invention.

The embodiments of the present invention described above may be implemented in a computer system 900 according to an embodiment of the present invention and shown in a block diagram in FIG. 9. The computer system 900 includes a processor 902, two memory devices 904, 906, and two input/output (I/O) devices 908, 910. Each of the memory devices 904, 906 is either a random-access memory (RAM), a read-only memory (ROM), a cache memory, or a storage device such as a hard disk drive, a floppy disk drive, an optical disk drive, or a tape cartridge drive. Each of the I/O devices 908, 910 is either a monitor, a pointing device such as a mouse, a keyboard, or a modem. The devices in the computer system 900 including the processor 902, the two memory devices 904, 906, and the two I/O devices 908, 910 communicate with each other through a bus 912 connected to the devices. Signals are sent on the bus 912 as needed by one or more of the devices, and arrive at other devices under a protocol according to one of the embodiments of the present invention described above. One skilled in the art having the benefit of this description will recognize that more devices such as processors, memory circuits, and I/O devices may be connected to the bus 912.

Those skilled in the art having the benefit of this description can appreciate that the present invention may be practiced with any computerized system including a bus. Such computerized systems may include, for example, a video game, a handheld calculator, a personal computer, or a multi-processor supercomputer, or an information appliance such as, for example, a cellular telephone, a pager, or a daily planner or organizer, or an information component such as, for example, a magnetic disk drive or telecommunications modem, or other appliance such as, for example, a hearing aid, washing machine or microwave oven having an electronic controller.

Figure 10:
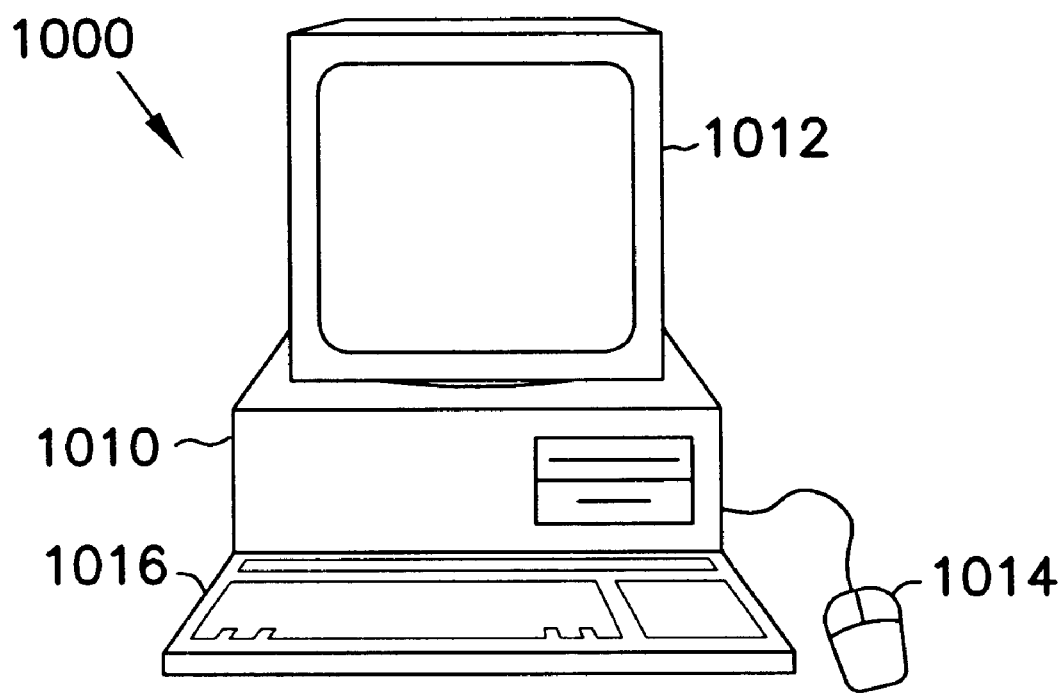
FIG. 10 is a block diagram of a personal computer according to an embodiment of the present invention.

The computer system 900 shown in FIG. 9 may take the form of a personal computer 1000 shown in FIG. 10. The personal computer 1000 includes a computer 1010 that is operatively coupled to a monitor 1012, a pointing device 1014, and a keyboard 1016. The computer 1010 includes a processor, a random-access memory (RAM), a read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The present invention is not particularly limited to one type of computer 1010. The monitor 1012 permits the display of information within a viewing area, including computer, video and other information, for viewing by a user of the personal computer 1000. The present invention is not limited to any particular monitor 1012, and the monitor 1012 is one type of display device that may be used in a system with the present invention. Such monitors include cathode ray tube (CRT) displays, as well as flat panel displays such as liquid crystal displays (LCD's). The pointing device 1014 permits a control of the screen pointer provided by graphical user interfaces. The present invention is not limited to any particular pointing device 1014. Such pointing devices include mouses, touch pads, trackballs, wheels, remote controls and point sticks. Finally, the keyboard 1016 permits entry of textual information into the computer 1010, as known within the art, and the present invention is not limited to any particular type of keyboard.

The present invention is not limited to uses involving unidirectional lines in buses. The present invention may be applied to substantially reduce the occurrence crowbar current in any bus line including control, address, and data lines in which communication takes place in one or more directions.

Although specific embodiments of the present invention have been illustrated and described herein, it will be appreciated by those skilled in the art having the benefit of this description that any arrangement which is calculated to achieve the same purpose may be substituted for the specific embodiments shown. The present invention is defined and limited only by the following claims and equivalents thereof.

What is claimed is:

1. A method comprising:
   driving a default signal on to a line that is either high or low from a plurality of drivers coupled to the line;
   selecting one of the drivers to be an active driver and the remaining drivers to be inactive drivers;
   putting each inactive driver in a high-impedance state;
   delaying for a first delay period;
   driving an information signal on to the line from the active driver;
   driving the default signal that is either high or low on to the line from the active driver;
   delaying for a second delay period;
   releasing each inactive driver from the high-impedance state; and
   driving the default signal that is either high or low on to the line from each inactive driver.

2. The method of claim 1, further comprising:
   enabling a center-tapped termination for each inactive driver coupled to the line when the inactive driver is put in a high-impedance state; and
   disabling the center-tapped termination for each inactive driver released from the high-impedance state.

3. The method of claim 1 wherein driving a default signal on to a line further comprises driving the default signal on to a line selected from the group consisting of a strobe line, a data line, and an address line.

4. A method comprising:
   driving a predetermined signal that is either high or low on to a line from a plurality of drivers coupled to the line;

selecting one of the drivers to be an active driver and the remaining drivers to be inactive drivers;

putting the inactive drivers in a high-impedance state;

driving an information signal on to the line from the active driver after driving the predetermined signal on to the line from the active driver;

receiving the information signal in a receiver coupled to the line;

driving the predetermined signal on to the line from the active driver after driving the information signal on to the line from the active driver;

releasing the inactive drivers from the high-impedance state; and driving the predetermined signal on to the line from the inactive drivers after releasing the inactive drivers.

5. The method of claim 4, further comprising:

delaying for a first predetermined number of clock cycles between putting the inactive drivers in the high-impedance state and driving an information signal on to the line from the active driver; and delaying for a second predetermined number of clock cycles between driving the predetermined signal on to the line from the active driver and releasing the inactive drivers from the high-impedance state.

6. The method of claim 4, further comprising:

enabling a center-tapped termination coupled to the line; and monitoring the line in the receiver.

7. The method of claim 4 wherein driving a predetermined signal that is either high or low on to a line further comprises driving the predetermined signal on to a line selected from the group consisting of a strobe line, a data line, and an address line.

8. The method of claim 4, further comprising controlling the drivers and the receiver with control signals from a central control circuit.

9. A system comprising:

a plurality of drivers coupled to a line;

a receiver coupled to the line; and a control circuit to:

control the receiver to monitor the line;

control the drivers to drive a default signal that is either high or low on to the line;

enable a center-tapped termination coupled to the line;

select one of the drivers to be an active driver and the remaining drivers to be inactive drivers;

put the inactive drivers into a high-impedance state;

control the active driver to drive an information signal on to the line after driving the default signal on to the line;

control the receiver to receive the information signal;

control the active driver to drive the default signal on to the line after driving the information signal on to the line;

release the inactive drivers from the high-impedance state; and control the inactive drivers to drive the default signal on to the line after being released from the high-impedance state.

10. The system of claim 9 wherein the control circuit comprises elements or instructions to:

cause a delay of one or more clock cycles after putting the inactive drivers into a high-impedance state and before controlling the active driver to drive the information signal; and cause a delay of one or more clock cycles after controlling the active driver to drive the default signal and before releasing the inactive drivers from the high-impedance state.

11. The system of claim 9 wherein the control circuit comprises elements or instructions to:

control the inactive drivers to couple a center-tapped termination to the line when putting the inactive drivers into a high-impedance state; and control the inactive drivers to decouple the center-tapped termination from the line when releasing the inactive drivers from the high-impedance state.

12. The system of claim 9 wherein the line is selected from the group consisting of a strobe line, a data line, and an address line.

13. A system comprising:

a plurality of drivers coupled to a line;

a receiver coupled to the line;

a processor; and a control circuit in each driver and the receiver, the control circuits being coupled to the processor by a plurality of lines to receive control signals from the processor to:

control the receiver to monitor the line;

control the drivers to drive a default signal on to the line;

select one of the drivers to be an active driver and the remaining drivers to be inactive drivers;

put the inactive drivers into a high-impedance state;

control the active driver to drive an information signal on to the line after driving the default signal on to the line; and control the receiver to receive the information signal.

14. The system of claim 13 wherein the control circuits are coupled to receive further control signals to:

control the default signal to be either high or low;

enable a center-tapped termination coupled to the line;

control the active driver to drive the default signal on to the line after driving the information signal on to the line;

release the inactive drivers from the high-impedance state; and control the inactive drivers to drive the default signal on to the line after being released from the high-impedance state.

15. The system of claim 13 wherein the line is selected from the group consisting of a strobe line, a data line, and an address line.

16. A system comprising:

a plurality of drivers coupled to a line;

a receiver coupled to the line, the receiver comprising a high-impedance input buffer and a center-tapped termination circuit; and a control circuit to:

control the receiver to monitor the line;

control the drivers to drive a default signal on to the line;

select one of the drivers to be an active driver and the remaining drivers to be inactive drivers;

put the inactive drivers into a high-impedance state;

control the active driver to drive an information signal on to the line after driving the default signal on to the line; and control the receiver to receive the information signal.

17. The system of claim 16 wherein the control circuit comprises elements or instructions to:

control the default signal to be either high or low;
enable a center-tapped termination coupled to the line;
control the active driver to drive the default signal on to the line after driving the information signal on to the line;
release the inactive drivers from the high-impedance state; and
control the inactive drivers to drive the default signal on to the line after being released from the high-impedance state.

18. The system of claim 16 wherein the line is selected from the group consisting of a strobe line, a data line, and an address line.

19. A system comprising:
a plurality of drivers coupled to a line, each driver comprising a tri-state output buffer and a center-tapped termination circuit;
a receiver coupled to the line; and
a control circuit to:
control the receiver to monitor the line;
control the drivers to drive a default signal on to the line;
select one of the drivers to be an active driver and the remaining drivers to be inactive drivers;
put the inactive drivers into a high-impedance state;
control the active driver to drive an information signal on to the line after driving the default signal on to the line; and
control the receiver to receive the information signal.

20. The system of claim 19 wherein the control circuit comprises elements or instructions to:
control the default signal to be either high or low;
enable a center-tapped termination coupled to the line;
control the active driver to drive the default signal on to the line after driving the information signal on to the line;
release the inactive drivers from the high-impedance state; and
control the inactive driven to drive the default signal on to the line after being released from the high-impedance state.

21. The system of claim 19 wherein the line is selected from the group consisting of a strobe line, a data line, and an address line.

22. A system comprising:
a plurality of drivers coupled to a unidirectional shared bus line;
a receiver coupled to the line; and
a control circuit to:
control the receiver to monitor the line;
control the drivers to drive a default signal on to the line;
select one of the drivers to be an active driver and the remaining drivers to be inactive drivers;
put the inactive drivers into a high-impedance state;
control the active driver to drive an information signal on to the line after driving the default signal on to the line; and
control the receiver to receive the information signal.

23. The system of claim 22 wherein the control circuit comprises elements or instructions to:
control the default signal to be either high or low;
enable a center-tapped termination coupled to the line;
control the active driver to drive the default signal on to the line after driving the information signal on to the line;
release the inactive drivers from the high-impedance state; and
control the inactive drivers to drive the default signal on to the line after being released from the high-impedance state.

24. The system of claim 22 wherein the line is selected from the group consisting of a strobe line, a data line, and an address line.

25. A circuit comprising:
a driver coupled to a line; and
a processor coupled to the driver by a plurality of lines to provide control signals to:
control the driver to drive a default signal on to the line;
control the driver to drive an information signal on to the line; and
control the driver to drive the default signal on to the line after driving the information signal on to the line.

26. The circuit of claim 25, further comprising:
a plurality of drivers coupled to the line;
a receiver coupled to the line;
a center-tapped termination coupled to the line; and
wherein the processor is coupled to the driver to provide control signals to:
control the default signal to be either high or low;
enable the center-tapped termination;
control the receiver to monitor the line;
control the drivers to drive the default signal on to the line;
select one of the drivers to be an active driver and the remaining drivers to be inactive drivers;
put the inactive drivers into a high-impedance state;
control the active driver to drive the information signal on to the line after driving the default signal on to the line; and
control the receiver to receive the information signal.

27. The circuit of claim 25 wherein the line is selected from the group consisting of a strobe line, a data line, and an address line.

28. A circuit comprising:
a driver comprising a tri-state output buffer and a first center-tapped termination circuit coupled to a line; and
a control circuit to:
control the driver to drive a default signal on to the line;
control the driver to drive an information signal on to the line; and
control the driver to drive the default signal on to the line after driving the information signal on to the line.

29. The circuit of claim 28, further comprising:
a plurality of drivers coupled to the line;
a receiver coupled to the line;
a second center-tapped termination circuit coupled to the line; and
wherein the control circuit comprises elements or instructions to:
control the default signal to be either high or low;
enable the second center-tapped termination circuit;
control the receiver to monitor the line;
control the drivers to drive the default signal on to the line;
select one of the drivers to be an active driver and the remaining drivers to be inactive drivers;
put the inactive drivers into a high-impedance state;
control the active driver to drive the information signal on to the line after driving the default signal on to the line; and
control the receiver to receive the information signal.

30. The circuit of claim 28 wherein the line is selected from the group consisting of a strobe line, a data line, and an address line.

31. A circuit comprising:
a plurality of drivers coupled to a line;
a receiver coupled to the line;
a center-tapped termination coupled to the line; and
a control circuit to:
control a default signal to be either high or low;
enable the center-tapped termination;
control the receiver to monitor the line;
control the drivers to drive the default signal on to the line;
select one of the drivers to be an active driver and the remaining drivers to be inactive drivers;
put the inactive drivers into a high-impedance state;
control the active driver to drive an information signal on to the line after driving the default signal on to the line;
control the receiver to receive the information signal;
control the active driver to drive the default signal on to the line after driving the information signal;
release the inactive drivers from the high-impedance state; and
control the inactive drivers to drive the default signal on to the line after being released from the high-impedance state.

32. The circuit of claim 31 wherein the control circuit comprises elements or instructions to:
control the inactive drivers to couple a center-tapped termination to the line when putting each inactive driver into a high-impedance state; and
control the inactive drivers to decouple the center-tapped termination from the line when releasing each inactive driver from the high-impedance state.

33. The circuit of claim 31 wherein the control circuit comprises elements or instructions to:
cause a delay of one or more clock cycles after putting the inactive drivers into the high-impedance state and before controlling the active driver to drive the information signal; and
cause a delay of one or more clock cycles after controlling the active driver to drive the default signal and before releasing the inactive drivers from the high-impedance state.

34. The circuit of claim 31 wherein the line is selected from the group consisting of a strobe line, a data line, and an address line.

35. A circuit comprising:
a plurality of drivers coupled to a line;
a receiver comprising a high-impedance input buffer and a center-tapped termination circuit coupled to the line; and
a control circuit to:
control a default signal to be either high or low;
enable the center-tapped termination circuit;
control the receiver to monitor the line;
control the drivers to drive the default signal on to the line;
select one of the drivers to be an active driver and the remaining drivers to be inactive drivers;
put the inactive drivers into a high-impedance state;
control the active driver to drive an information signal on to the line after driving the default signal on to the line;
control the receiver to receive the information signal; and
control the active driver to drive the default signal on to the line after driving the information signal.

36. The circuit of claim 35 wherein the control circuit comprises elements or instructions to:
release the inactive drivers from the high-impedance state; and
control the inactive drivers to drive the default signal on to the line after being released from the high-impedance state.

37. The circuit of claim 35 wherein the line is selected from the group consisting of a strobe line, a data line, and an address line.

38. A circuit comprising:
a plurality of drivers coupled to a line;
a receiver coupled to the line;
a center-tapped termination circuit coupled to the line;
a control circuit to:
control a default signal to be either high or low;
enable the center-tapped termination circuit;
control the receiver to monitor the line;
control the drivers to drive the default signal on to the line;
select one of the drivers to be an active driver and the remaining drivers to be inactive drivers;
put the inactive drivers into a high-impedance state;
control the active driver to drive an information signal on to the line after driving the default signal on to the line;
control the receiver to receive the information signal; and
control the active driver to drive the default signal on to the line after driving the information signal; and
wherein one or more of the drivers and the receiver comprise:
a high-impedance input buffer;
a tri-state output buffer; and
a center-tapped termination circuit.

39. The circuit of claim 38 wherein the control circuit comprises elements or instructions to:
release the inactive driven from the high-impedance state; and
control the inactive driven to drive the default signal on to the line after being released from the high-impedance state.

40. The circuit of claim 38 wherein the line is selected from the group consisting of a strobe line, a data line, and an address line.

41. A circuit comprising:
a plurality of drivers coupled to a unidirectional shared bus line;
a receiver coupled to the line;
a center-tapped termination coupled to the line; and
a control circuit to:
control a default signal to be either high or low;
enable the center-tapped termination;
control the receiver to monitor the line;
control the drivers to drive the default signal on to the line;
select one of the drivers to be an active driver and the remaining drivers to be inactive drivers;
put the inactive drivers into a high-impedance state;
control the active driver to drive an information signal on to the line after driving the default signal on to the line;

control the receiver to receive the information signal; and control the active driver to drive the default signal on to the line after driving the information signal.

42. The circuit of claim 41 wherein the control circuit comprises elements or instructions to:

release the inactive drivers from the high-impedance state; and control the inactive drivers to drive the default signal on to the line after being released from the high-impedance state.

43. The circuit of claim 41 wherein the line is selected from the group consisting of a strobe line, a data line, and an address line.

* * * * *

UNITED STATES PATENT AND TRADEMARK OFFICE
CERTIFICATE OF CORRECTION

PATENT NO. : 6,738,844 B2
DATED : May 18, 2004
INVENTOR(S) : Muljono et al.

Page 1 of 1

It is certified that error appears in the above-identified patent and that said Letters Patent is hereby corrected as shown below:

Column 11,
Line 39, delete "driven" and insert -- drivers --, therefor.

Column 14,
Lines 42 and 44, delete "driven" and insert -- drivers --, therefor.

Signed and Sealed this

Twelfth Day of October, 2004

JON W. DUDAS
*Director of the United States Patent and Trademark Office*